United States Patent [19]

Yoshimura

[11] Patent Number: 5,065,266

[45] Date of Patent: Nov. 12, 1991

[54] ROTARY TRANSMITTING MECHANISM FOR AUTO-REVERSE TAPE RECORDER

[75] Inventor: Toshio Yoshimura, Tokyo, Japan

[73] Assignee: Tanashin Denki Co., Ltd., Tokyo, Japan

[21] Appl. No.: 490,721

[22] Filed: Mar. 8, 1990

[30] Foreign Application Priority Data

Mar. 13, 1989 [JP] Japan .............................. 1-28255[U]

[51] Int. Cl.$^5$ ............................................ G11B 15/32
[52] U.S. Cl. .................................................. 360/96.3
[58] Field of Search ..................... 360/96.2, 96.3, 96.4

[56] References Cited

U.S. PATENT DOCUMENTS

| 4,224,647 | 9/1980 | Umezawa et al. | 360/96.3 |
| 4,383,282 | 5/1983 | Osanai | 360/96.3 |
| 4,408,237 | 10/1983 | Takahashi et al. | 360/96.3 |
| 4,564,873 | 1/1986 | Hashimoto et al. | 360/96.3 |
| 4,581,665 | 4/1986 | Ito et al. | 360/96.3 |
| 4,639,800 | 1/1987 | Tanaka et al. | 360/96.2 |

Primary Examiner—Robert S. Tupper

Attorney, Agent, or Firm—Lieberman Rudolph & Nowak

[57] ABSTRACT

A rotary transmitting mechanism for an auto-reverse tape recorder having a change-over gear and associated charge-over supporting member disposed on the head-mounting plate is provided. The mechanism utilizes motor driven left and right transmission gears, a change-over gear supporting member movably supported on the head-mounting plate, and a change-over plate movably mounted on the upper surface of the chasis. When the change-over plate moves in either a left- or right-hand direction, the change-over gear supporting member is likewise moved to allow the change-over gear to be separated from the reel gear and transmission gear on one side while meshing with the other side's reel gear and transmission gear. To elastically absorb the excess movement of the change-over plate, the change-over gear supporting member has two elastic arms protruding from both sides. By providing such a mechanism, more efficiently and lower cost are obtained.

6 Claims, 3 Drawing Sheets

ROTARY TRANSMITTING MECHANISM FOR AUTO-REVERSE TAPE RECORDER

TECHNICAL FIELD

The present invention relates to rotary transmitting mechanism for an auto-reverse tape recorder in which only a change-over gear and associated supporting member are mounted on the head-mounting plate, thereby enabling the construction of the tape recorder to be simplified.

BACKGROUND OF THE INVENTION

A conventional mechanism for changing the rotary transmitting channel in an auto-reverse tape recorder is disclosed in a Japanese Patent Application Laid Open No. Sho 60-113,349. In this conventional mechanism, when a slide plate 1 is in the left-hand position as shown in FIG. 3, a right change-over gear 4 is meshed with a small-diameter gear $5_1$ of a right transmission gear 5 by means of the clockwise rotation of a right rotatable plate 2 due to the tension force of a tension spring 3, while a left change-over gear 7 is separated from a small-diameter gear $8_1$ of a left transmission gear 8 by means of the clockwise rotation of a left rotatable plate 6 due to the compressive force of the tension spring 3. Moreover, since a pinch roller change-over plate 9 is inclined to the left by means of a cam pin 10, a right pinch roller 12 on a right end of a rod-shaped spring 11 is passed to, and made contact with, a right capstan 13, and at the same time, a left pinch roller 14 on a left end of the rod-shaped spring 11 is separated from a left capstan 15. Accordingly, the turning force of the motor (not shown) is transmitted to a right reel support 17 through the right transmission gear 5, the small-diameter gear $5_1$, the right change-over gear 4 and a right reel gear 16, and therefore a tape (not shown) travels to the right through the right pinch roller 12 and right capstan 13 and then wound on a right reel (not shown).

On the other hand, when the slide plate 1 is in the right-hand position as shown in FIG. 4, the right change-over gear 4 is separated from the small-diameter gear $5_1$ of the right transmission gear 5 by means of the counterclockwise rotation of the right rotatable plate 2 due to the compressive force of the tension spring 3, while the left change-over gear 7 is meshed with the small-diameter gear $8_1$ of the left transmission gear 8 by means of the counterclockwise rotation of the right rotatable plate 6 due to the tension force of the tension spring 3. Further, since the pinch roller change-over plate 9 is inclined to the right by means of the cam pin 10, the right pinch roller 12 on the right end of the rod-shaped spring 11 is separated from the right capstan 13, and at the same time, the left pinch roller 12 on the left end of the rod-shaped spring 11 is pressed to, and made contact with, a left capstan 15. Thus, the turning force of the motor is transmitted to a left reel support 19 through the small-diameter gear $8_1$ of the left transmission gear 8 engaged with a large-diameter gear $5_2$ of the right transmission gear 5, the left change-over gear 7 and the left reel gear 18, and therefore the tape (not shown) is traveled to the left through the left pinch roller 14 and left capstan 15 and then wound on a left reel (not shown).

In a conventional mechanism for changing the rotary transmitting channel, there exists the disadvantage that the number of component parts thereof is increased and the construction thereof is complicated, because, as above-described, the mechanism is composed of a pair of change-over gears, a pair of complicated, rotatable plates for supporting the change-over gears, and the tension spring installed between two rotatable plates.

SUMMARY OF THE INVENTION

It is a principal object of the present invention to provide an improved rotary transmitting mechanism for an auto-reverse tape recorder which avoids the above discussed disadvantages of prior art mechanisms by decreasing the number of parts and enabling the construction of the tape recorder to be simplified.

Accordingly, with this object in view, the present invention resides in a rotary transmitting mechanism for an auto-reverse tape recorder, comprising left and right transmission gears disposed respectively in the vicinity of the left and right reel gears, and being meshed with each other and driven by the motor; a change-over gear supporting member supported movably on the head-mounting plate mounting the magnetic head to be able to travel in the left or right-hand direction within a certain extent; a change-over gear disposed on said change-over gear supporting member to separate from both one side reel gear and transmission gear and, at the same time, mesh with both the other side reel gear and transmission gear when said change-over gear supporting member is moved in said left or right-hand direction; and a change-over plate for controlling the traveling direction of the tape disposed movably on the upper surface of the chassis, and having an engaging portion for engaging with said change-over gear supporting member, so as to enable said change-over gear supporting member to be traveled in said left or right-hand direction on the head-mounting plate.

More particulary, said change-over gear supporting member is made of synthetic resin and has two elastic arms protruded from both sides thereof so as to absorb elastically the excess movement of said change-over plate, and said engaging portion of said change-over plate is composed of an engaging opening having two pressing side edges positioned immediately adjacent to respective corresponding elastic arms of said change-over gear supporting member for pressing said change-over gear supporting member in said left or right direction when the change-over plate is moved in said left or right direction.

Thus, when said change-over plate is moved in said left or right direction to allow said change-over gear supporting member to be moved in the corresponding direction, said change-over gear is separated from both one side reel gear and transmission gear, and at the same time, meshed with both the other side reel gear and transmission gear.

BRIEF DESCRIPTION OF DRAWINGS

The present invention will become more readily apparent from the following description of a preferred embodiment thereof shown, by way of example only, in the accompanying drawings, wherein.

DETAILED DESCRIPTION OF THE INVENTION

A preferred embodiment of the present invention will now be described with reference to the accompanying drawings, and especially to FIGS. 1 and 2.

Figure 1:
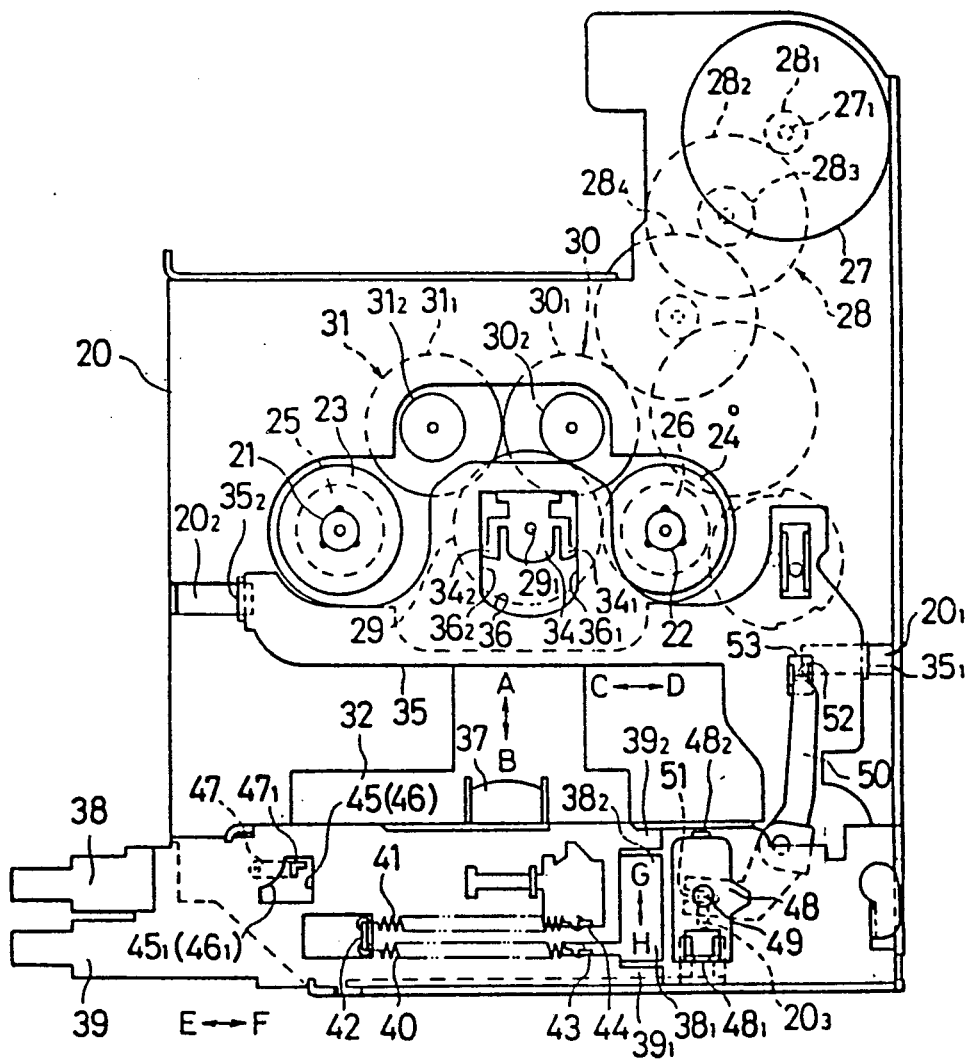
FIG. 1 is a top plan view of an auto-reverse tape recorder which is provided with a rotary transmitting mechanism according to the present invention.
Figure 2:
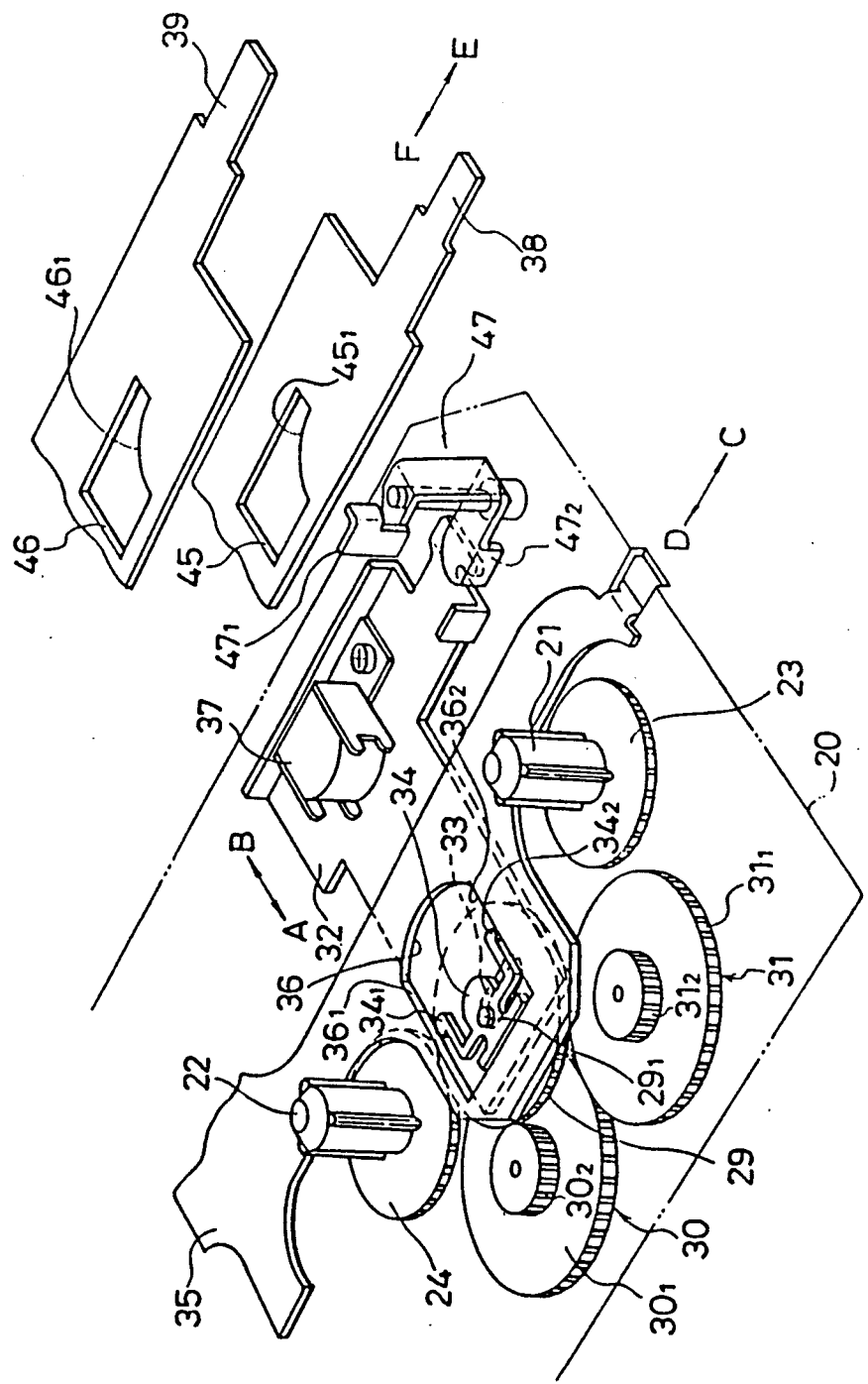
FIG. 2 is a perspective view, partially broken away, of the mechanism for changing the rotary transmitting channel shown in FIG. 1.
Figure 3:
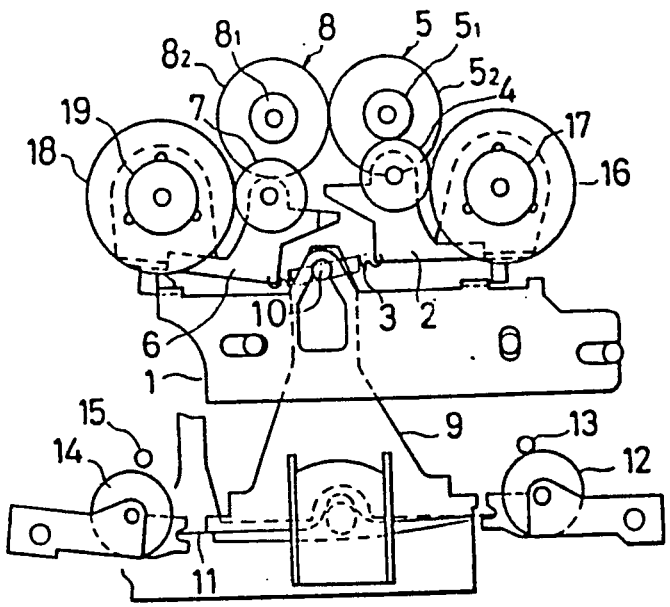
FIG. 3 is a top plan view illustrating the prior art mechanism for changing the rotary transmitting channel which a head-mounting plate is positioned in the left-hand position.
Figure 4:
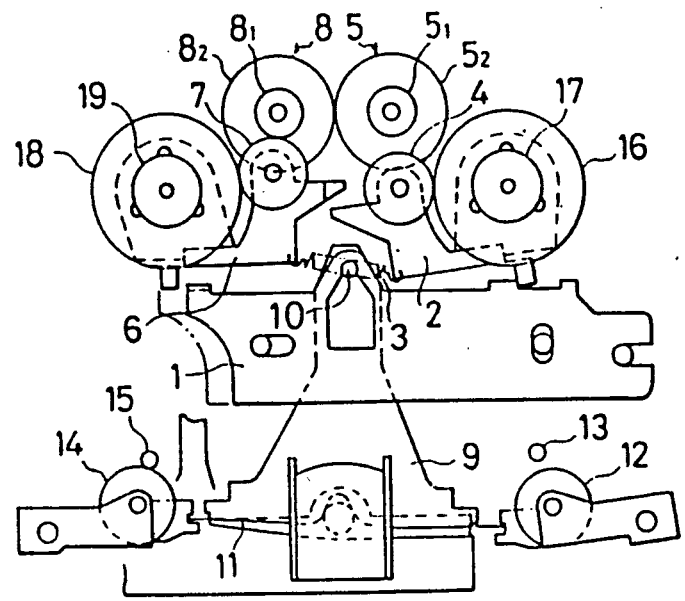
FIG. 4 is a top plan view of the same mechanism as shown in FIG. 3 except that the head mounting plate is positioned in the right-hand position.

FIG. 1 is a top plan view of an auto-reverse tape recorder which is provided with a rotary transmitting mechanism according to the present invention, and FIG. 2 is a perspective view, partially broken away, of the rotary transmitting mechanism shown in FIG. 1. In these drawings, a chassis is generally designated as 20. Disposed rotatably in the center area of the chassis 20 are a pair of reel supports 21 and 22.

A reel gear for normal speed rotation 23 and reel gear for high-speed rotation 25 are fixed to the lower end of the reel support 21, while a reel gear for normal speed rotation 24 and reel gear for high-speed rotation 26 are fixed to the lower end of the reel support 22. It should be noted that, in the drawings, the gear is illustrated in a simple circle form corresponding to the pitch circle thereof for a facile illustration. The turning force of a motor 27 is to be selectively transmitted to the reel support 21 through a power transmission mechanism 28, a change-over gear 29 and the reel gear for normal-speed rotation 23, or to the reel support 22 through the power transmission mechanism 28, the change-over gear 29 and the reel gear for normal speed rotation 24. The motor 27 is fixed on one side upper surface of the chassis 20. The power transmission mechanism 28 which is disposed on the under side of the chassis 20 is composed of a first gear $28_1$ fixed on a shaft of the motor 27, a second gear $28_2$ engaging with the first gear $28_1$, a third gear $28_3$ rotating coaxially together with the second gear $28_2$, a fourth gear $28_4$ engaging with the third gear $28_3$, a right transmission gear 30 engaging with the fourth gear $28_4$, and a left transmission gear 31 engaging with the right transmission gear 30. The right transmission gear 30 consists of large and small-diameter gears $30_1$ and $30_2$ rotating coaxially with each other, and the left transmission gear 31 also consists of large and small-diameter gear $31_1$ and $31_2$ rotating coaxially with each other. The large-diameter gear $31_1$ of the left transmission gear 31 is meshed with the large-diameter gear $30_1$ of the right transmission gear 30 which is, in turn, meshed with the fourth gear $28_4$. The change-over gear 29 is supported rotatably on the under surface of the front end of a head-mounting plate (slide plate) 32 which is disposed to be able to travel in the direction of arrows A and B. A shaft $29_1$ of the change-over gear 29 which passes movably through, and projects upwardly from, an elongated opening 33 formed on the front end of the head-mounting plate 32 in the direction perpendicular to the traveling direction thereof is supported rotatably to a change-over gear supporting member 34.

The change-over gear supporting member 34 is made of synthetic resin and has two elastic arms $34_1$ and $34_2$ which are protruded from both sides thereof, and engaged with an engaging opening 36 formed in the vicinity of the center portion of a change-over plate 35. The change-over plate 35 is disposed on the upper surface of the chassis 20 to be able to slide in the right or left-hand direction (the direction of arrows C and D perpendicular to the traveling direction of the head-mounting plate 32) on the head-mounting plate 32. The change-over plate 35 has slide engaging pieces $35_1$ and $35_2$ positioned in slide engaging openings $20_1$ and $20_2$ which are formed in the chassis 20. In case that the head-mounting plate 32 were traveled in the direction of arrow A, when the change-over plate 35 is moved in the left-hand direction (the direction of arrow C), the change-over gear 29 is meshed with both the reel gear for normal speed rotation 23 of the left reel support 21 and the small-diameter gear $31_2$ of the left transmission gear 31, thereby resulting in the normal speed rotation of the left reel support 21. At this time, the elastic arm $34_1$ on one side of the change-over gear supporting member 34 is pressed by one pressing side edge $36_1$ of the engaging opening 36 of the change-over plate 35 so that the change-over gear 29 is biased in the direction engaging with the reel gear for normal speed rotation 23.

On the contrary, in the case where the head-mounting plate 32 has traveled in the direction of arrow A, when the change-over plate 35 is moved in the right-hand direction (the direction of arrow D), the change-over gear 29 is engaged with both the reel gear for normal speed rotation 24 of the right reel support 22 and the small-diameter gear $30_2$ of the right transmission gear 30. Also, together with this movement of the change-over plate 35, a left pinch roller (not shown) is separated from a left capstan (not shown), and at the same time, a right pinch roller (not shown) is pressed to, and makes contact with a right capstan (not shown) so that the right reel support 22 is rotated at a normal speed, thereby allowing the traveling direction of tape to be reversed. At this time, the elastic arm $34_2$ on the other side of the change-over gear supporting member 34 is pressed by the other pressing side edge $36_2$ of the engaging opening 36 of the change-over plate 35 so that the change-over gear 29 is biased in the direction engaging with the reel gear 24 of the right reel support 22.

The head-mounting plate 32 mounts a magnetic head 37 thereon. The magnetic head 37 is separated from, or moved towards the tape of the tape cassette according to the movement of the head-mounting plate 32 which is urged in the direction of arrows A by means of a elastic spring (not shown). The head-mounting plate 32 is moved in connection with the movement of first and second high-speed operating members 38 and 39. The first and second high-speed operating members 38 and 39 are disposed one over the other on the other side upper surface of the chassis 20 to reciprocate in the same direction as the traveling direction of the change-over plate 35, i.e., the direction of arrows E and F. This high-speed operating members 38 and 39 are biased in the direction of arrow E by means of return springs 40 and 41, and can be reciprocated separately. The return springs 40 and 41 on one ends thereof are supported to a spring support 42 on the chassis 20, and on the other sides thereof supported to respective corresponding spring supports 43 and 44 on the first and second high-speed operating members 38 and 39. Perforated on the high-speed operating members 38 and 39 are cam openings 45 and 46. The cam openings 45 and 46 have respectively arched cam surfaces $45_1$ and $46_1$ which make contact with a upper contact piece $47_1$ of a rotatable lever 47 supported rotatably on the upper surface of the chassis 20. Thus, when at least one of the high-speed operating members 38 and 39 is moved in the direction of arrow F, the upper contact piece $47_1$ of the rotatable lever 47 is contact-traveled along the cam surface $45_1$ and/or $46_1$ so that the head-mounting plate 32 which is made to contact with a lower contact piece $47_2$ of the rotatable lever 47 is forcedly retreated in the direction of arrow B against the elastic force of the spring.

The high-speed operating members 38 and 39 have respectively first and second press portions $38_1$ and $38_2$, and $39_1$ and $39_2$. The first press portions $38_1$ and $39_1$ are made contact with a first portion $48_1$ on one end of a rotatable member 48, whereas the second press portions $39_1$ and $39_2$ are made contact with a second portion $48_2$ on the other end of the rotatable member 48. The rotatable member 48 is disposed above the chassis 20 so that a shaft 49 projected from the under surface of the center portion thereof is rotatably and movably inserted within a elongated hole $20_3$ formed along the traveling axis direction of the head-mounting plate 32.

Accordingly, the rotatable member 48 can be moved in the same traveling direction as that of the head-mounting plate 32, i.e., the direction of arrow G and H as shown in FIG. 1, within the limit of the elongated hole $20_3$. The rotatable member 48 on the approximate middle thereof is connected to the change-over plate 35 through a rotatable arm 50. The rotatable arm 50 on the approximate middle thereof is supported rotatably on one side of the chassis 20. The rotatable arm 50 has a engaging opening 51 engaged rotatably with the shaft 49 of the rotatable member 48, and a engaging piece 52 fitted rotatably to a fit opening 53 of the change-over plate 35. Accordingly, when the change-over plate 35 is moved in the right-hand direction (the direction of arrow D), the rotatable member 48 is moved in the direction of arrow G through the rotatable arm 50 and then positioned in the first position. Also, when the change-over plate 35 is moved in the left-hand direction (the direction of arrow C), the rotatable member 48 is moved in the direction of arrow H through the rotatable arm 50 and then positioned in the second position.

A pair of capstans and pinch rollers (not shown) respectively are disposed symmetrically on the chassis 20 so that when the head-mounting plate 32 is advanced in the direction of arrows A, a pair of pinch rollers are alternatively pressed and then made to contact with respective corresponding capstans, and when the head-mounting plate 32 is retreated in the direction of arrow B, two pinch rollers are separated from respective corresponding capstans.

Now the operation of the rotary transmitting mechanism of the subject invention will be described.

First, the normal speed operation of the mechanism will be explained.

In FIG. 1, the change-over plate 35 is in the position in the direction of arrow D. Also, both the first and second high-speed operating member 38 and 39 are in the position in the direction of arrow E, and consequently the head-mounting plate 32 is in the traveled position on the direction of arrow A so that the magnetic head 37 is made to contact with a tape of a tape cassette (not shown) which is loaded in the reel support 21 and 22 and also the pinch roller (not shown) is made to contact with the capstan (not shown) through the tape. Since the change-over plate 35 is in the position in the direction of arrow D, as mentioned above, the change-over gear 29 is meshed with both the reel gear for normal speed rotation 24 of the right reel support 22 and the small-diameter gear $30_1$ of the right transmission gear 30. Thus, in the state of FIG. 1, the right reel support 22 is rotated at a normal speed, and therefore the recording, or playing operation which the tape is moved at a normal speed from the left reel support 21 toward the right reel support 22 is performed.

When the change-over plate 35 is moved in the direction of arrow C from the position shown in FIG. 1, the change-over gear supporting member 34 travels in the direction of arrow C along the elongated opening 33 together with the change-over gear 29. At this time, the change-over gear 29 is separated from both the reel gear for normal speed rotation 24 of the right reel support 22 and the small-diameter gear $30_2$ of the right transmission gear 30, and then meshed with both the reel gear for normal speed rotation 23 of the left reel support 21 and the small-diameter gear $31_2$ of the left transmission gear 31. Accordingly, the left reel support 21 is rotated at a normal speed to allow the tape traveling direction to be reversed, thereby permitting the recording or playing operation in which the tape is moved at a normal speed from the right reel support 22 toward the left reel support 21.

Next, the high-speed operation of the mechanism according to the prevent invention will be explained.

When the change-over plate 35 is moved in the direction of arrow D permitting the tape to move at a normal speed from the left reel support 21 toward the right reel support 22, the rotatable member 48 is moved in the direction of arrow G and then positioned in the first position.

In such a state, when only the first high speed operating member 38 is moved in the direction of arrow F, the head-mounting plate 32 is moved in the direction of arrow B allowing the change-over gear 29 to be separated from both the reel gear for normal speed rotation 24 of the right reel support 22 and the small-diameter gear $30_2$ of the right transmission gear 30. Further, by moving of the first high-speed operating member 38 in the direction of arrow F, the first press portion $38_1$ presses the first portion $48_1$ of the rotatable member 48 so that the rotatable member 48 will be rotated counterclockwise from the position shown in FIG. 1. Together with the rotating of the rotatable member 48, a high-speed change-over member (not shown) is rotated in one direction, and a gear for fast forwarding motion (not shown) supported to the high-speed change-over member is meshed with both the gear for high-speed rotation 25 of the left reel support 21 and the large-diameter gear $31_1$ of the left transmission gear 31. Also, the magnetic head 37 and pinch roller are retreated by moving of the first high-speed operating member 38 accompanied by the rotation of the rotatable lever 47 so that the left reel support 21 is rotated at a high-speed to allow the tape to travel at high-speed from the right reel support 22 toward the left reel support 21.

Moreover, when rotatable member 48 is positioned in the first position, and only the second high-speed operating member 39 is traveled in the direction of arrow F, the second press portion $39_2$ of the second high-speed operating member 39 presses the second portion $48_2$ of the rotatable member 48. In consequence, the rotatable member 48 is rotated clockwise from the position shown in FIG. 1. Together with this rotation of the rotatable member 48, the high-speed change-over member (not shown) is rotated in the other direction, and the gear for first forwarding motion (not shown) is meshed with both the gear for high-speed rotation 26 of the right reel support 22 and the large-diameter gear $30_1$ of the right transmission gear 30. Also, the magnetic head 37 and pinch roller are retreated by moving the second high-speed operating member 39 accompanied by the rotation of the rotatable lever 47 so that the right reel support 22 is rotated at a high-speed to allow the tape to travel at high-speed from the left reel support 21 toward the right reel support 22.

On the other hand, when the change-over plate 35 is moved in the direction of arrow C from the position shown in FIG. 1 to allow the tape to travel at a normal speed from the right reel support 22 toward the left reel support 21, the rotatable member 48 is moved in the direction of arrow H and then positioned in the second position.

In such a state, when only the first high-speed operating member 38 is moved in the direction of arrow F, the second press portion $38_2$ of the member 38 presses the second portion $48_2$ of the rotatable member 48 to allow the rotatable member 48 to be rotated clockwise from the position shown in FIG. 1. Therefore, the right reel support 22 is rotated at a high-speed, as described above.

Also, when the rotatable member 48 was positioned in the second position, and only the second high-speed operating member 39 is moved in the direction of the arrow F, the first press portion $39_1$ of the member 39 presses the first portion $48_1$ of the rotatable member 48 to allow the rotatable member 48 to be rotated counter-clockwise from the position shown in FIG. 1, thereby rotating the left reel support 21 at a high-speed in the same manner as above-mentioned.

When both the first and second high-speed operating member 38 and 39 are traveled in the direction of arrow F while the tape is traveling at a normal speed from the left reel support 21 toward the right reel support 22 or vice versa, the change-over plate 35 is moved in the direction of arrow C or D to allow the tape traveling direction to be reversed. And then, when the first and second high-speed operating member 38 and 39 are released to allow them to travel in the direction of arrow E by the elastic force of the springs 40 and 41, the change-over plate 35 is locked and maintained in the traveled position thereof.

From the above description, it will be readily seen that the rotary transmitting mechanism of this invention is constituted so that only a change-over gear and associated change-over supporting member are disposed on the head-mounting plate, thereby enabling the tape recorder to be simplified. Moreover, the rotary transmitting mechanism channel of the invention does not require the conventional tention spring enabling the number of component parts thereof to be decreased. Also, the mechanism of the invention allows the engaging rotation between the change-over gear and the transmission gear or the reel gear to be smoothly performed, while preventing component part failure, since the change-over gear supporting member is made of sythetic resin and has the elastic arms protruded from both sides thereof so as to absorb elastically the excess movement of the change-over plate.

What is claimed is:

1. A rotary transmitting mechanism for use in an auto-reverse tape recorder, which comprises:
   (a) a change-over gear supporting member movably supported by a head-mounting plate, the change-over gear supporting member being capable of restricted linear motion to a left or right position;
   (b) a change-over gear rotatably supported by the change-over gear supporting member, the change-over gear being capable of simultaneously engaging a left transmission gear and a left reel gear when the change-over gear supporting member is in left position and simultaneously engaging a right transmission gear and a right reel gear when the change-over gear supporting member is in the right position;
   (c) a change-over plate for controlling the winding direction of a tape, the change-over plate having a engaging portion capable of engaging with the change-over gear supporting member so as to enable the change-over gear supporting member to be moved to the left or right position.

2. A rotary transmitting mechanism of claim 1, wherein engaging portion of the change-over plate comprises an opening into which the change-over gear supporting member is nestled.

3. A rotary transmitting mechanism of claim 1, wherein the change-over gear supporting member is made of an elastic substance.

4. A rotary transmitting mechanism of claim 3, wherein the elastic substance is a synthetic resin.

5. A rotary transmitting mechanism of claim 3, wherein the change-over gear supporting member has two arms protruding from both the right and left sides so as to elastically absorb any excess movement of the change-over plate.

6. A rotary transmitting mechanism of claim 2, wherein the gear supporting member has two elastic arms protruding from both the right and left sides which contact the opening in the change-over plate so as to nestle the gear supporting member within the opening and elastically absorb any excess movement of the change-over plate.

* * * * *